(12) United States Patent
Foitzik et al.

(10) Patent No.: US 11,110,802 B2
(45) Date of Patent: Sep. 7, 2021

(54) METHOD FOR OPERATING A REGENERATIVE BRAKING SYSTEM OF A VEHICLE AND CONTROL UNIT FOR A REGENERATIVE BRAKING SYSTEM OF A VEHICLE

(71) Applicant: Robert Bosch GmbH, Stuttgart (DE)

(72) Inventors: Bertram Foitzik, Ilsfeld (DE); Matthias Kistner, Bretzfeld (DE); Otmar Bussmann, Abstatt (DE); Rolf Ellwein, Sachsenheim (DE); Urs Bauer, Sachsenheim (DE); Robert Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 15/557,870

(22) PCT Filed: Jan. 22, 2016

(86) PCT No.: PCT/EP2016/051276
§ 371 (c)(1),
(2) Date: Sep. 13, 2017

(87) PCT Pub. No.: WO2016/146277
PCT Pub. Date: Sep. 22, 2016

(65) Prior Publication Data
US 2018/0079313 A1 Mar. 22, 2018

(30) Foreign Application Priority Data

Mar. 18, 2015 (DE) .......................... 10 2015 204 866.7

(51) Int. Cl.
*B60L 7/26* (2006.01)
*B60T 8/40* (2006.01)
(Continued)

(52) U.S. Cl.
CPC .................. *B60L 7/26* (2013.01); *B60L 7/18* (2013.01); *B60T 8/4081* (2013.01);
(Continued)

(58) Field of Classification Search
CPC .... B60T 8/4081; B60T 8/4072; B60T 8/4872; B60T 13/741; B60T 2210/12; B60T 2270/604; B60T 2270/60; B60L 7/26
(Continued)

(56) References Cited

U.S. PATENT DOCUMENTS

| | | | | |
|---|---|---|---|---|
| 6,425,644 | B2 * | 7/2002 | Kawahata | B60T 8/367 303/113.3 |
| 7,311,163 | B2 * | 12/2007 | Oliver | B60L 7/26 180/165 |

(Continued)

FOREIGN PATENT DOCUMENTS

| | | |
|---|---|---|
| CN | 102887138 A | 1/2013 |
| CN | 103328281 A | 9/2013 |

(Continued)

OTHER PUBLICATIONS

International Search Report dated Apr. 13, 2016, of the corresponding International Application PCT/EP2016/051276 filed Jan. 22, 2016.

*Primary Examiner* — Thomas W Irvin
(74) *Attorney, Agent, or Firm* — Norton Rose Fulbright US LLP; Gerard A. Messina (57) ABSTRACT

A method for operating a regenerative braking system of a vehicle by activating at least one motor employable in generator mode taking into consideration a first information with regard to a requested setpoint total braking torque and a second information with regard to an available generator braking torque which is maximally executable by the at least one motor employable in generator mode, if the setpoint
(Continued)

total braking torque exceeds a threshold value and/or a piece of warning information regarding a transition to a backup level that is potentially imminent or has occurred of the regenerative braking system, even if the setpoint total braking torque is less than or equal to the maximally executable available generator braking torque, sufficient brake fluid is transferred via at least one hydraulic actuator to a wheel brake cylinder of the regenerative braking system that an air gap of the particular wheel brake cylinder is closed.

12 Claims, 2 Drawing Sheets

(51) Int. Cl.
  *B60L 7/18* (2006.01)
  *B60T 13/74* (2006.01)
  *B60T 8/48* (2006.01)
(52) U.S. Cl.
  CPC ............ *B60T 13/741* (2013.01); *B60T 8/4072* (2013.01); *B60T 8/4872* (2013.01); *B60T 2210/12* (2013.01); *B60T 2270/604* (2013.01)
(58) Field of Classification Search
  USPC .................................................. 303/151, 152
  See application file for complete search history.

(56) References Cited

U.S. PATENT DOCUMENTS

| | | | | |
|---|---|---|---|---|
| 7,458,650 | B2* | 12/2008 | Toyota | B60T 1/10 303/151 |
| 8,521,350 | B2* | 8/2013 | Minamiura | B60L 58/12 701/22 |
| 8,630,780 | B2* | 1/2014 | Bunk | B60T 8/1755 303/10 |
| 8,794,719 | B2* | 8/2014 | Matsushita | B60L 7/24 303/122.09 |
| 8,862,358 | B2* | 10/2014 | Bayar | B60L 7/18 303/152 |
| 9,016,808 | B2* | 4/2015 | Maki | B60T 8/3275 303/151 |
| 9,333,957 | B2* | 5/2016 | Ross | B60T 8/4872 |
| 9,527,388 | B2* | 12/2016 | Saito | B60L 7/18 |
| 9,610,930 | B2* | 4/2017 | Marx | B60T 8/4872 |
| 10,189,454 | B2* | 1/2019 | Yamamoto | B60L 7/26 |
| 2006/0196712 | A1* | 9/2006 | Toyota | B60K 6/445 180/165 |
| 2017/0232849 | A1* | 8/2017 | Yamamoto | B60L 7/26 303/15 |
| 2018/0361856 | A1* | 12/2018 | Zhao | B60W 20/14 |

FOREIGN PATENT DOCUMENTS

| | | |
|---|---|---|
| CN | 103359095 A | 10/2013 |
| DE | 10325266 A1 | 1/2004 |
| EP | 2418132 A1 | 2/2012 |
| EP | 2463165 A1 | 6/2012 |
| JP | 2005329740 A | 12/2005 |
| JP | 2007196923 A | 8/2007 |
| JP | 2013043489 A | 3/2013 |
| JP | 2013086626 A | 5/2013 |
| JP | 2014012429 A | 1/2014 |
| WO | 2013092294 A1 | 6/2013 |
| WO | 2014154435 A1 | 10/2014 |

* cited by examiner

METHOD FOR OPERATING A REGENERATIVE BRAKING SYSTEM OF A VEHICLE AND CONTROL UNIT FOR A REGENERATIVE BRAKING SYSTEM OF A VEHICLE

FIELD

The present invention relates to a method for operating a regenerative braking system of a vehicle. Furthermore, the present invention relates to a control unit for a regenerative braking system of a vehicle and a regenerative braking system for a vehicle.

BACKGROUND INFORMATION

Figure 1:
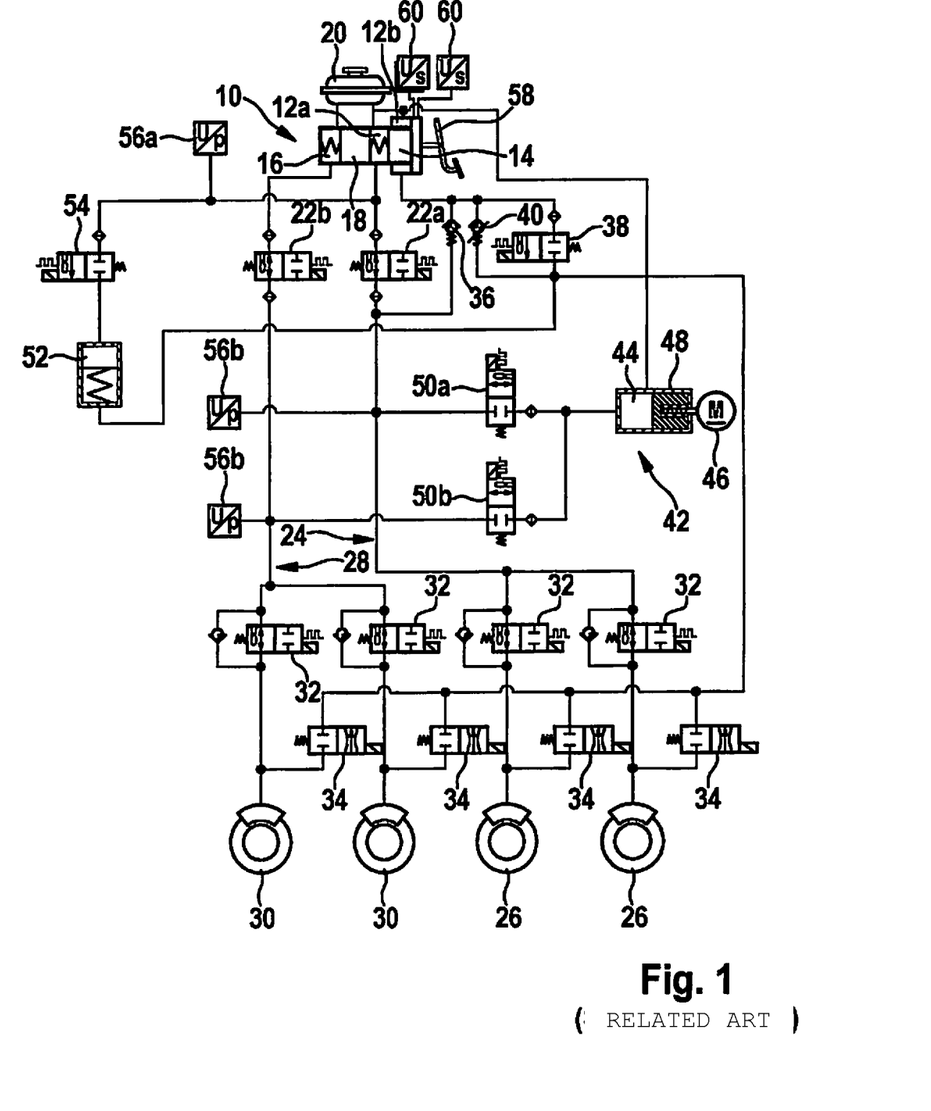
FIG. 1 shows a schematic illustration of a conventional regenerative braking system.

FIG. 1 shows a schematic illustration of a conventional regenerative braking system.

The regenerative braking system for a vehicle which is schematically illustrated in FIG. 1 includes a brake master cylinder 10 having a first pressure chamber which includes a first partial volume 12a and a second partial volume 12b as the braking volume. Partial volumes 12a and 12b are reducible with the aid of the assigned piston walls of an adjustable push-rod piston 14. Moreover, brake master cylinder 10 has a second pressure chamber 16 and an adjustable floating piston 18. First partial volume 12a, second partial volume 12b, and second pressure chamber 16 are each connected to a brake fluid reservoir 20 via compensating bores.

The regenerative braking system of FIG. 1 also includes a first brake circuit 24, which has first wheel brake cylinders 26 and is connected to first partial volume 12a via a first cut-off valve 22a, and a second brake circuit 28, which has second wheel brake cylinders 30 and is connected to second pressure chamber 16 via a second cut-off valve 22b. Each wheel brake cylinder 26 and 30 is assigned a wheel inlet valve 32 and a wheel outlet valve 34, respectively.

Moreover, second partial volume 12b is connected to first brake circuit 24 via a check valve 36. Additionally, second partial volume 12b is connected to brake fluid reservoir 20 via an electrically controllable valve 38 as well as via a controlled check valve 40.

The conventional regenerative braking system also includes a piston-cylinder device 42, whose pressure chamber 44 is delimited by a piston 48 which is adjustable by operating an motor 46. Pressure chamber 44 of piston-cylinder device 42 is connected to first brake circuit 24 via a third cut-off valve 50a and to second brake circuit 28 via a fourth cut-off valve 50b. Moreover, pressure chamber 44 of piston-cylinder device 42 is hydraulically connected to brake fluid reservoir 20.

Furthermore, the conventional regenerative braking system includes a simulator device 52 which is hydraulically connected to first partial volume 12a via a simulator valve 54. A pre-pressure sensor 56a is connected to first brake circuit 24 in such a way that pre-pressure sensor 56a is connected upstream from simulator valve 54. Each brake circuit 24 and 26 [sic; 28] is additionally connected to one brake pressure sensor 56b. To ascertain an actuating intensity of an actuation of a brake actuating element 58 of the regenerative braking system by a driver, the regenerative braking system also includes brake actuating sensors 60.

The braking system described above is additionally equipped with at least one (not illustrated) motor/electric motor employable in generator mode. By braking the vehicle equipped with the regenerative braking system using a generator-based operation of the motor employable in generator mode at least one (not illustrated) battery of the vehicle is rechargeable. However, an available generator braking torque, which is maximally executable with the aid of the at least one motor employable in generator mode, for braking the vehicle, varies over time. For example, the maximally executable available generator braking torque is at a speed of the vehicle below a minimum speed (necessary to engage the motor employable in generator mode) or when the at least one rechargeable battery is fully charged at (nearly) zero. Therefore, in addition to a first information regarding a requested (for example by actuating brake actuating element 58) setpoint total braking torque, a second information regarding the maximally executable available generator braking torque is generally taken into consideration when activating the at least one motor employable in generator mode. Only if the setpoint total braking torque is executable at least partially by the maximally executable available generator braking torque, is a generator braking torque which is less than or equal to the setpoint total braking torque and less than or equal to the maximally executable available generator braking torque applied to at least one wheel and/or at least one axle of the vehicle with the aid of the at least one motor employable in generator mode.

SUMMARY

The present invention provides a method for operating a regenerative braking system of a vehicle, a control unit for a regenerative braking system of a vehicle, and a regenerative braking system for a vehicle.

The present invention provides options for pilot control of volumes for compensating for at least the at least one air gap or other braking effects which result in an increased volume intake by the at least one wheel brake cylinder at a comparatively large setpoint total braking torque (above the threshold value) and/or in the case of . . . a transition to the backup level that is potentially imminent or has occurred of the particular regenerative braking system. Transferring the fluid to the at least one wheel brake cylinder thus makes it possible to ensure in a targeted manner in those situations, in which a sudden loss of a high generator braking torque is to be anticipated/expected due to the braking system transitioning to the backup level, that the driver is still able to reliably effectuate sufficient brake pressure in the at least one wheel brake cylinder to brake his/her vehicle, if necessary, while having an easily applicable driver brake pedal travel. The present invention thus contributes to improved braking comfort for the driver even after his/her regenerative braking system has transitioned to the backup level. At the same time, the present invention increases a safety standard of a regenerative braking system.

The present invention is in particular advantageous for a braking system including a simulator which is connected to its brake master cylinder. It is pointed out, however, that the implementability/usability of the present invention is not limited to a braking system of this type.

Since the present invention provides a driver having a regenerative braking system with an improved braking comfort and a higher safety standard of the regenerative braking system, it also increases an acceptance for regenerative braking systems among drivers. The present invention thereby encourages drivers to decide to use a regenerative braking system, which allows them to drive their vehicles at a lower fuel consumption and a lower pollutant emission.

In one advantageous specific embodiment of the method, a setpoint volume of the brake fluid which is transferred via the hydraulic actuator to the at least one wheel brake cylinder is established taking into consideration at least one estimated and/or ascertained increased volume intake of at least one subarea of the braking system hydraulics. In particular, the setpoint volume may be established high enough for at least brake pressure to build up in the at least one wheel brake cylinder in addition to closing the at least one air gap of the at least one wheel brake cylinder. In this way, a friction braking torque may be used already at the beginning of a sudden loss of the generator braking torque of the at least one motor employable in generator mode (for example due to a breakdown of the vehicle electrical system) for braking the vehicle via the at least one wheel brake cylinder (which is not affected by the breakdown of the vehicle electrical system). This significantly reduces a brake pedal travel which has yet to be applied by the driver to brake the vehicle.

For example, the setpoint volume of the brake fluid which is transferred via the hydraulic actuator to the at least one wheel brake cylinder may be established as the increased volume intake taking into consideration at least one estimated and/or ascertained air quantity in at least the subarea of the braking system hydraulics. By carrying out the specific embodiment of the method described here, it is thus advantageously possible to respond to the presence of air in at least that subarea of the braking system hydraulics.

Alternatively or additionally, the setpoint volume of the brake fluid which is transferred via the hydraulic actuator to the at least one wheel brake cylinder may also be established by taking into consideration at least one estimated and/or ascertained friction value at at least one wheel of the vehicle. For example, it is possible while driving the vehicle at a significant transverse acceleration, which results in an increase in the air gap, to reliably close even an increased air gap at the at least one wheel brake cylinder.

The setpoint volume of the brake fluid which is transferred via the hydraulic actuator to the at least one wheel brake cylinder may also be established by taking into consideration the at least one warning information. In particular, an increase in the setpoint volume may be used to respond to a rapid release of the gas pedal and/or a rapid actuation of a brake actuating element.

The advantages described above are also ensured in a correspondingly designed control unit for a regenerative braking system of a vehicle. It is pointed out that the control unit may be refined according to the specific embodiments of the method described above.

Furthermore, a regenerative braking system for a vehicle including a control unit of this type contributes to ensuring the described advantages.

BRIEF DESCRIPTION OF THE DRAWINGS

Additional features and advantages of the present invention are explained below on the basis of the figures.

DETAILED DESCRIPTION OF EXAMPLE EMBODIMENTS

Figure 2:
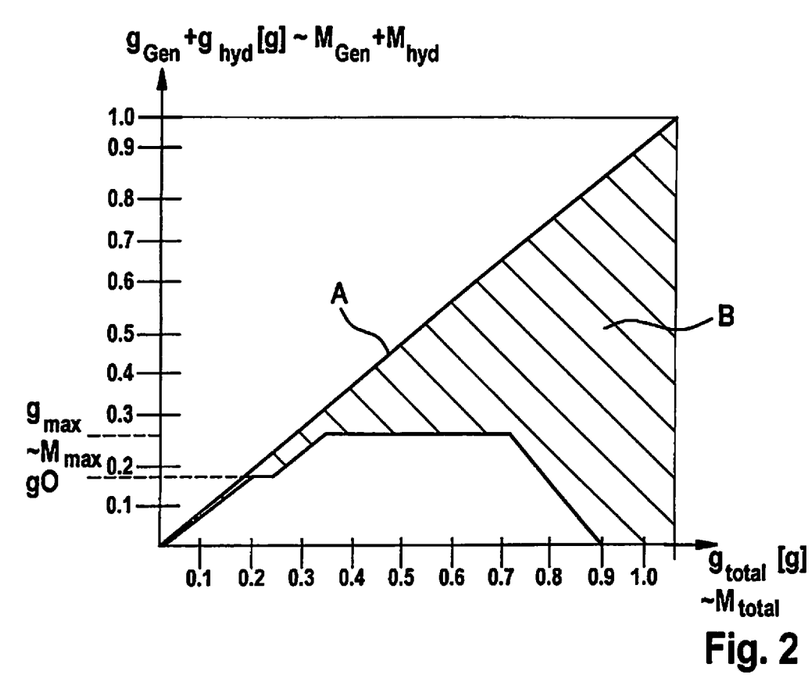
FIG. 2 shows a coordinate system to explain one specific embodiment of the method for operating a regenerative braking system of a vehicle.

FIG. 2 shows a coordinate system to explain one specific embodiment of the method for operating a regenerative braking system of a vehicle.

The regenerative braking system, which is schematically illustrated in FIG. 1, may be for example operated with the aid of the method described in the following. However, it is pointed out that the implementability of the method described in the following is not limited to a specific design of the braking system or an equipment of the particular regenerative braking system with the braking system components illustrated in FIG. 1. The method is instead implementable in a plurality of different types of braking systems which are equipped/cooperate with at least one motor/electric motor employable in generator mode, such as with at least one (electric) drive motor employable in generator mode. Furthermore, an implementability of the method is not limited to a specific type of vehicle/type of motor vehicle of the vehicle/motor vehicle equipped with the regenerative braking system.

When the method is carried out, the at least one motor, employable in generator mode, of the regenerative braking system is activated by taking into consideration a first information $g_{total}$ with regard to a requested setpoint total braking torque $M_{total}$ and a second information $g_{max}$ with regard to an available generator braking torque $M_{max}$ which is maximally executable by the at least one motor employable in generator mode. Setpoint total braking torque $M_{total}$ may be, for example, requested by a driver of the vehicle (by actuating his/her brake actuating element/brake pedal). First information $g_{total}$ may be output in this case by at least one brake actuating sensor, such as in particular by a driver braking force sensor, a pedal travel sensor and/or a rod position sensor. Likewise, setpoint total braking torque $M_{total}$ may also be requested by an automatic speed control of the vehicle, for example an adaptive cruise control (ACC system) or an emergency braking system. The method described here may thus also be used to carry out an autonomous braking action or an automatic emergency braking action requested by the automatic speed control (without the driver actuating the brake actuating element). Setpoint total braking torque $M_{total}$ and/or a setpoint deceleration $g_{total}$ of the vehicle to be decelerated may be, for example, taken into consideration as first information $g_{total}$ when activating the at least one motor employable in generator mode. Likewise, first information $g_{total}$ may, however, also include/be at least one other variable which corresponds to setpoint total braking torque $M_{total}$ or setpoint deceleration $g_{total}$.

In the specific embodiment of FIG. 2, second information $g_{max}$ is, by way of example, a regenerative deceleration $g_{max}$ which is maximally achievable (exclusively) with the aid of the at least one motor employable in generator mode (without a wheel brake cylinder of the regenerative braking system). Alternatively, maximally executable available generator braking torque $M_{max}$, an instantaneous vehicle speed of the vehicle to be decelerated, and/or a state of charge of at least one battery, which is rechargeable with the aid of the at least one motor employable in generator mode, may, however, also be taken into consideration as second information $g_{max}$ when activating the at least one motor employable in generator mode. In this way, it may be in particular taken into consideration that maximally executable available generator braking torque $M_{max}$ (or maximally achievable regenerative deceleration $g_{max}$) is (nearly) equal to zero if the at least one rechargeable battery is fully charged or if an instantaneous vehicle speed is below a minimum speed which is necessary to operate the at least one motor employable in generator mode. Alternatively or additionally, second information $g_{max}$ may, however, also include at least one other variable which corresponds to maximally executable available generator braking torque $M_{max}$ (or to maximally achievable regenerative deceleration $g_{max}$).

In the coordinate system of FIG. 2, the abscissa indicates setpoint deceleration $g_{total}$ (in g/gravitational acceleration). A sum $g_{Gen}+g_{hyd}$ from a regenerative deceleration $g_{Gen}$ (actually effectuated by the at least one motor employable in generator mode) and a hydraulic deceleration $g_{hyd}$ (in g/gravitational acceleration) which is applied by at least one wheel brake cylinder of the regenerative braking system is indicated by the ordinate of the coordinate system of FIG. 2.

The at least one motor employable in generator mode is activated in such a way that if setpoint total braking torque $M_{total}$ is executable at least partially by maximally executable available generator braking torque $M_{max}$, a generator braking torque $M_{Gen}$ which is smaller than or equal to setpoint total braking torque $M_{total}$ and smaller than or equal to maximally executable available generator braking torque $M_{max}$ is applied to at least one wheel and/or at least one axle of the vehicle with the aid of the at least one motor employable in generator mode. However, it is ascertained in the method of FIG. 2, prior to activating the at least one motor employable in generator mode, whether setpoint total braking torque $M_{total}$ or the variable of first information $g_{total}$, which corresponds to setpoint total braking torque $M_{total}$, exceeds a fixedly predefined or establishable limiting value g0. For example, it is examined in the specific embodiment of FIG. 2 whether setpoint deceleration $g_{total}$ exceeds a limiting deceleration g0 as limiting value g0.

If setpoint total braking torque $M_{total}$, or the variable of first information $g_{total}$ which corresponds to setpoint total braking torque $M_{total}$, exceeds fixedly predefined or establishable limiting value g0, at least sufficient brake fluid is transferred by at least one hydraulic actuator to at least one wheel brake cylinder of the regenerative braking system to close at least one air gap of the particular wheel brake cylinder, even if setpoint total braking torque $M_{total}$ is less than or equal to maximally executable available generator braking torque $M_{max}$. If the at least one motor employable in generator mode breaks down/fails in the case of a setpoint total braking torque $M_{total}$ (or of the corresponding variable of first information $g_{total}$) above limiting value g0, at least the air gap of the at least one wheel brake cylinder is therefore already closed. The driver may thus immediately effectuate a (further) increase in at least one brake pressure in the at least one wheel brake cylinder with the aid of his/her driver braking force without first having to effectuate a volume transfer sufficient to close the at least one air gap to the at least one wheel brake cylinder. By previously closing the at least one air gap of the at least one wheel brake cylinder with the aid of the at least one hydraulic actuator, a time interval is shortened between the breakdown/failure of the at least one motor employable in generator mode and a beginning of the (further) increase in the at least one brake pressure in the at least one wheel brake cylinder. Moreover, additional effort on the part of the driver, which is necessary to effectuate a volume transfer sufficient to close the at least one air gap, is dispensed with. The method described here thus provides good braking comfort for the driver even after the breakdown/failure of the at least one motor employable in generator mode.

A sudden breakdown/failure of the at least one motor employable in generator mode occurs, for example, if the vehicle electrical system breaks down in the vehicle to be decelerated/that has been decelerated. Such a situation is also referred to as a transition of the regenerative braking system to its backup level. In a situation of this type, generator braking torque $M_{Gen}$ of the at least one motor employable in generator mode is dispensed with (almost) immediately. Due to the rapid and simple compensation for dispensed with generator braking torque $M_{Gen}$ which is implemented when the method described here is carried out, a good safety standard is, however, still ensured even after the regenerative braking system has transitioned to its backup level.

Advantageously, the at least one air gap is (preemptively) closed any time setpoint total braking torque $M_{total}$ (or the corresponding variable of first information $g_{total}$) exceeds limiting value g0. In particular, this allows for a good transition of the regenerative braking system to its backup level if the vehicle is intensively decelerated.

In the specific embodiment of FIG. 2, requested setpoint total braking torque $M_{total}$ (or the corresponding variable of first information $g_{total}$) is met from a purely regenerative point of view (see characteristic curve A), as long as setpoint total braking torque $M_{total}$ (or the corresponding variable of first information $g_{total}$) is below limiting value g0 (and smaller than or equal to maximally executable available generator braking torque $M_{max}$). As long as setpoint total braking torque $M_{total}$ (or the corresponding variable of first information $g_{total}$) is below limiting value g0, a generator braking torque $M_{Gen}$ which is equal to setpoint total braking torque $M_{total}$ is therefore (in the case of a requested setpoint total braking torque $M_{total}$ which is less than or equal to maximally executable available generator braking torque $M_{max}$) applied with the aid of the at least one motor employable in generator mode to the at least one wheel and/or the at least one axle of the vehicle to be decelerated. Preferably, in the case of a setpoint total braking torque $M_{total}$ (or the corresponding variable of first information $g_{total}$) below limiting value g0, a hydraulic braking torque $M_{hyd}$ of the at least one wheel brake cylinder of the regenerative braking system remains (nearly) equal to zero. In the specific embodiment of FIG. 2, a regenerative deceleration $g_{Gen}$ which is equal to setpoint deceleration $g_{total}$ is applied with the aid of the at least one motor, employable in generator mode, to the at least one wheel and/or the at least one axle of the vehicle to be decelerated, while hydraulic deceleration $g_{hyd}$ which is applied with the aid of the at least one wheel brake cylinder of the regenerative braking system remains (nearly) equal to zero. (Hydraulic deceleration $g_{hyd}$ is represented in FIG. 2 by area B.)

Sufficient brake fluid is moreover transferred with the aid of the at least one hydraulic actuator to at least one wheel brake cylinder of the regenerative braking system at a setpoint total braking torque $M_{total}$ (or the corresponding variable of first information $g_{total}$) equal to/above limiting value g0 so that a hydraulic braking torque $M_{hyd}$ unequal to zero (or a hydraulic deceleration $g_{hyd}$ unequal to zero) of the at least one wheel brake cylinder is built up, generator braking torque $M_{Gen}$ (or regenerative deceleration $g_{Gen}$) being adjusted in such a way that a sum of hydraulic braking torque $M_{hyd}$ and generator braking torque $M_{Gen}$ corresponds to setpoint total braking torque $M_{total}$ (or a sum of hydraulic deceleration $g_{hyd}$ and regenerative deceleration $g_{Gen}$ corresponds to setpoint deceleration $g_{total}$) This is shown with the aid of characteristic curve A in FIG. 2. By comparing setpoint total braking torque $M_{total}$ (or the corresponding variable of first information $g_{total}$) to limiting value g0, a braking action of the driver is exactly recognizable at the blending brake. This makes it possible to already start building up a (comparatively low) brake pressure in the at least one wheel brake cylinder in a targeted manner, thus being able to respond more advantageously to a failure of the at least one motor employable in generator mode in a situation of this type.

In one advantageous refinement, a setpoint volume (as the pilot volume) of the brake fluid (or hydraulic braking torque $M_{hyd}$ or hydraulic deceleration $g_{hyd}$) which is transferred via the at least one hydraulic actuator to the at least one wheel brake cylinder may be established by taking into consideration at least one estimated and/or ascertained increased volume intake of at least one subarea of the hydraulics of the regenerative braking system. For example, at least one estimated and/or ascertained air quantity in at least the subarea of the hydraulics of the regenerative braking system may be taken into consideration when establishing the setpoint volume (or hydraulic braking torque $M_{hyd}$ or hydraulic deceleration $g_{hyd}$). Alternatively or additionally, the setpoint volume (or hydraulic braking torque $M_{hyd}$ or hydraulic deceleration $g_{hyd}$) may also be established by taking into consideration at least one estimated and/or ascertained friction value at at least one wheel of the vehicle. Likewise, at least one piece of warning information regarding a transition to a backup level that is potentially imminent or has occurred of the regenerative braking system may be taken into consideration when establishing the setpoint volume (or hydraulic braking torque $M_{hyd}$ or hydraulic deceleration $g_{hyd}$). Moreover, an increase in the setpoint volume (as the pilot volume) is possible on the basis of a zero-volume estimation. Subsequently, the at least one hydraulic actuator is activated/operated in such a way that an actual volume, which corresponds to the setpoint volume (or hydraulic braking torque $M_{hyd}$ or hydraulic deceleration $g_{hyd}$), is transferred via the at least one hydraulic actuator to the at least one wheel brake cylinder.

A piston-cylinder device (plunger device), whose pressure chamber is delimited by a piston which is displaceable by operating an motor, may, for example, be used as the at least one hydraulic actuator. The piston of the piston-cylinder device may be in particular linearly displaceable by operating the motor (see FIG. 1). Alternatively or additionally to the piston-cylinder device described here, at least one pump may, however, also be used as the at least one hydraulic actuator. Braking system components which are conventionally already installed in the regenerative braking system may thus be used to carry out the method described here. It is therefore not necessary to expand the regenerative braking system with additional braking system components to carry out the method described here. The method may thus be used to operate any regenerative braking system, without increasing its installation space or its manufacturing costs.

It is pointed out that the regenerative braking system operated with the aid of the method described here may also include a brake master cylinder having a relatively small brake master cylinder diameter although a brake master cylinder of this type has only a reduced volume reserve on the backup level due to its reduced brake master cylinder diameter. As a result of the advantageous utilization of the at least one hydraulic actuator at least for closing the at least one air gap, at least a sufficiently high brake pressure in the at least one wheel brake cylinder may still be effectuated on the backup level despite the reduced volume reserve of the brake master cylinder. The agreeable brake actuating feel (pedal feel) for the driver braking into the brake master cylinder with the relatively small brake master cylinder diameter may thus be used for the regenerative braking system with the aid of the method described here without any disadvantages.

Alternatively or additionally to ascertaining whether setpoint total braking torque $M_{total}$, or the variable of first information $g_{total}$ corresponding to setpoint total braking torque $M_{total}$, exceeds fixedly predefined or establishable limiting value g0, it is also possible to evaluate at least one piece of warning information regarding a transition to a backup level that is potentially imminent or has occurred of the regenerative braking system. In this case, if the at least one piece of warning information regarding the transition to the backup level that is potentially imminent or has occurred is present, even if the setpoint total braking torque (or the variable of first information $g_{total}$ corresponding to setpoint total braking torque $M_{total}$) is smaller than or equal to maximally executable available generator braking torque $M_{max}$, at least the brake fluid, which is sufficient to close at least the air gap of the particular wheel brake cylinder, is preferably transferred via the at least one hydraulic actuator to the at least one wheel brake cylinder. The method described here may thus already ensure (in particular prior to the probably imminent transition to the backup level) that the driver may effectuate without delay with the aid of his/her driver braking force a (further) increase in the at least one brake pressure in the at least one wheel brake cylinder without first having to close the at least one air gap of the at least one wheel brake cylinder. This process also contributes to increasing the braking comfort and the safety standard of the particular braking system.

In one advantageous refinement of the braking system, threshold value g0 may also be established by taking into consideration the air quantity present in the braking system or a friction value at the at least one wheel brake cylinder.

The method described here in particular provides a safety function for a transition to the backup level. By moving brake fluid to the at least one wheel brake cylinder (with the aid of the at least one hydraulic actuator) already while shutting down the system, the at least one wheel brake cylinder may be pre-filled and a (low) brake pressure may be set in same. As a result, a comparatively high brake fluid volume is already present in the at least one wheel brake cylinder when the driver brakes into the regenerative braking system in the backup level even at a relatively small driver braking force.

Figure 3:
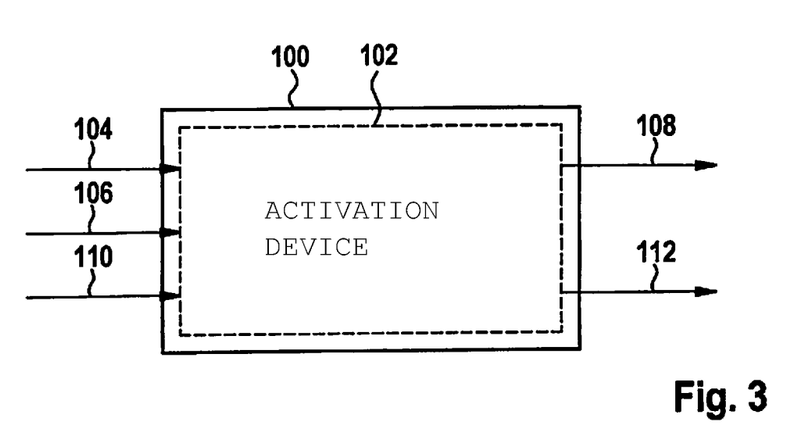
FIG. 3 shows a schematic illustration of one specific embodiment of the control unit.

FIG. 3 shows a schematic illustration of one specific embodiment of the control unit.

Control unit 100 which is schematically illustrated in FIG. 3 may be used, for example, in the regenerative braking system illustrated schematically in FIG. 1. However, it is pointed out that a usability of control unit 100 is neither limited to this type of braking system nor to a specific type of vehicle/motor vehicle of the vehicle/motor vehicle equipped with the regenerative braking system.

Control unit 100 includes an activation device 102 which is designed to receive at least one predefined braking signal 104 with regard to a setpoint total braking torque $M_{total}$ requested by the driver or an automatic speed control of the vehicle and an information signal 106 with regard to an available generator braking torque $M_{max}$ which is maximally executable by at least one motor employable in generator mode of the regenerative braking system. Moreover, activation device 102 is designed to activate the at least one motor employable in generator mode with the aid of at least one control signal 108 taking into consideration at least predefined braking signal 104 and information signal 106.

This process occurs in such a way that if setpoint total braking torque $M_{total}$ is executable at least partially by maximally executable available generator braking torque $M_{max}$, a generator braking torque $M_{Gen}$ which is smaller than or equal to setpoint total braking torque $M_{total}$ and smaller than or equal to maximally executable available generator braking torque $M_{max}$ is applicable/applied to at least one wheel and/or at least one axle of the vehicle with the aid of the at least one motor employable in generator mode.

In the specific embodiment of FIG. 3, activation device 102 is moreover designed to receive at least one piece of warning information 110 regarding a transition to a backup level that is potentially imminent or has occurred of the regenerative braking system. If the at least one piece of warning information 110 is output to activation device 102, activation device 102 is designed to activate at least one hydraulic actuator of the regenerative braking system (with the aid of at least one actuator control signal 112), even if setpoint total braking torque $M_{total}$ is less than or equal to maximally executable available generator braking torque $M_{max}$, in such a way that at least sufficient brake fluid is transferable/transferred via the at least one hydraulic actuator to at least one wheel brake cylinder of the regenerative braking system to close at least one air gap of the particular wheel brake cylinder. It may thus be ensured with the aid of control unit 100 that at least the air gap of the at least one wheel brake cylinder is already closed in the case of a sudden failure of the at least one motor employable in generator mode due to a sudden transition of the braking system to its backup level. In one advantageous refinement, a minimum brake pressure, which is (fixedly) predefined or established by activation device 102 may also be buildable/built up with the aid of the brake fluid transferred via the at least one hydraulic actuator to the at least one wheel brake cylinder.

In one advantageous refinement, activation device 102 may be additionally designed to establish a setpoint volume variable with regard to a setpoint volume of the brake fluid which is to be transferred via the at least one hydraulic actuator to the at least one wheel brake cylinder taking into consideration at least one estimated and/or ascertained increased volume intake of at least one subarea of the braking system hydraulics. Likewise, activation device 102 may be designed to establish the setpoint volume variable taking into consideration at least one estimated and/or ascertained friction value at at least one wheel of the vehicle. It is also advantageous when activation device 102 is designed to establish the setpoint volume variable taking into consideration the at least one piece of warning information 110.

In one alternative specific embodiment, activation device 102 may also compare setpoint total braking torque $M_{total}$, or a corresponding variable of predefined braking signal 104 to a fixedly predefined or establishable threshold value g0. If setpoint total braking torque $M_{total}$ exceeds threshold value g0, activation device 102 is designed in this case to activate the at least one hydraulic actuator of the regenerative braking system (with the aid of at least one actuator control signal 112), even if setpoint total braking torque $M_{total}$ is smaller than or equal to the maximally executable available generator braking torque $M_{max}$, in such a way that at least sufficient brake fluid is transferable via the at least one hydraulic actuator to at least one wheel brake cylinder of the regenerative braking system to close at least one air gap of the particular wheel brake cylinder. The method of FIG. 2 may thus also be carried out with the aid of control unit 100.

Control unit 100 may thus provide all the advantages already described above. A regenerative braking system for a vehicle including control unit 100 also implements the described advantages. The regenerative braking system may include at least some of the braking system components illustrated in FIG. 1. However, it is pointed out that the braking system components of FIG. 1 are to be interpreted only as an example for the implementability of the regenerative braking system including control unit 100.

What is claimed is:

1. A method for operating a regenerative braking system of a vehicle, comprising:

activating at least one motor, having a generator mode, of the regenerative braking system taking into consideration a first information with regard to a setpoint total braking torque requested by a driver or an automatic speed control of the vehicle, and a second information with regard to an available generator braking torque which is maximally executable without overcharging a battery of the vehicle using the at least one motor employable in generator mode in such a way that if the setpoint total braking torque is executable at least partially by the maximally executable available generator braking torque, a generator braking torque which is less than or equal to the setpoint total braking torque and less than or equal to maximally executable available generator braking torque is applied to at least one of at least one wheel and at least one axle of the vehicle, with the aid of the at least one motor employable in the generator mode;

wherein the application of the generator torque is performed such that, when the setpoint total braking torque is less than or equal to the maximally executable available generator braking torque:

prior to at least one of (a) the setpoint total braking torque exceeding a fixedly predefined or establishable threshold value and (b) presence of warning information regarding a transition to a backup level of the regenerative braking system that is potentially imminent or has occurred, the generator torque is applied with approximately zero application of hydraulic torque; and subsequently, in response to the at least one of (a) the setpoint total braking torque exceeding the fixedly predefined or establishable threshold value and (b) the presence of the warning information, the generator torque is applied in combination with application of the hydraulic torque, so that the generator torque and the hydraulic torque in combination provide the setpoint total braking torque, wherein the application of the hydraulic torque includes transfer of sufficient brake fluid via at least one hydraulic actuator to at least one wheel brake cylinder of the regenerative braking system to close at least one air gap of the at least one wheel brake cylinder.

2. The method as recited in claim 1, wherein a setpoint volume of the brake fluid transferred via the at least one hydraulic actuator to the at least one wheel brake cylinder is established by taking into consideration at least one of an estimated and ascertained increased volume intake of at least one subarea of the braking system hydraulics.

3. The method as recited in claim 1, wherein a setpoint volume of the brake fluid transferred via the at least one hydraulic actuator to the at least one wheel brake cylinder is established by taking into consideration at least one of an estimated and ascertained friction value at at least one wheel of the vehicle.

4. The method as recited in claim 1, wherein a setpoint volume of the brake fluid transferred via the at least one hydraulic actuator to the at least one wheel brake cylinder is established by taking into consideration the at least one piece of warning information.

5. The method as recited in claim 1, wherein the application of the generator torque is performed such that, when the setpoint total braking torque is less than or equal to the maximally executable available generator braking torque:
   prior to the setpoint total braking torque exceeding the fixedly predefined or establishable threshold value, the generator torque is applied with approximately zero application of the hydraulic torque; and
   subsequently, in response to the setpoint total braking torque exceeding the fixedly predefined or establishable threshold value, the generator torque is applied in combination with the application of the hydraulic torque, so that the generator torque and the hydraulic torque in combination provide the setpoint total braking torque.

6. The method as recited in claim 1, wherein the application of the generator torque is performed such that, when the setpoint total braking torque is less than or equal to the maximally executable available generator braking torque:
   prior to the presence of warning information regarding the transition to the backup level of the regenerative braking system that is potentially imminent or has occurred, the generator torque is applied with approximately zero application of the hydraulic torque; and
   subsequently, in response to the presence of the warning information, the generator torque is applied in combination with the application of the hydraulic torque, so that the generator torque and the hydraulic torque in combination provide the setpoint total braking torque.

7. A method for operating a regenerative braking system of a vehicle, comprising:
   activating at least one motor, having a generator mode, of the regenerative braking system taking into consideration a first information with regard to a setpoint total braking torque requested by a driver or an automatic speed control of the vehicle, and a second information with regard to an available generator braking torque which is maximally executable using the at least one motor employable in generator mode in such a way that if the setpoint total braking torque is executable at least partially by the maximally executable available generator braking torque, a generator braking torque which is less than or equal to the setpoint total braking torque and less than or equal to maximally executable available generator braking torque is applied to at least one of at least one wheel and at least one axle of the vehicle, with the aid of the at least one motor employable in the generator mode;
   wherein the application of the generator torque is performed such that, when the setpoint total braking torque is less than or equal to the maximally executable available generator braking torque:
   prior to at least one of (a) the setpoint total braking torque exceeding a fixedly predefined or establishable threshold value and (b) presence of warning information regarding a transition to a backup level of the regenerative braking system that is potentially imminent or has occurred, the generator torque is applied with approximately zero application of hydraulic torque; and
   subsequently, in response to the at least one of (a) the setpoint total braking torque exceeding the fixedly predefined or establishable threshold value and (b) the presence of the warning information, the generator torque is applied in combination with application of the hydraulic torque, so that the generator torque and the hydraulic torque in combination provide the setpoint total braking torque, wherein the application of the hydraulic torque includes transfer of sufficient brake fluid via at least one hydraulic actuator to at least one wheel brake cylinder of the regenerative braking system to close at least one air gap of the at least one wheel brake cylinder, and a setpoint volume of the brake fluid transferred via the at least one hydraulic actuator to the at least one wheel brake cylinder is established by taking into consideration at least one of an estimated and ascertained air quantity in at least one subarea of hydraulics of the braking system.

8. A control unit for a regenerative braking system of a vehicle, comprising:
   an activation device designed to activate the at least one motor having a generator mode taking into consideration at least one provided predefined braking signal regarding a setpoint total braking torque requested by a driver or an automatic speed control of the vehicle and at least one provided information signal regarding an available generator braking torque which is maximally executable without overcharging a battery of the vehicle using the at least one motor, employable in generator mode, of the regenerative braking system in such a way that when the setpoint total braking torque is executable at least partially by the maximally executable available generator braking torque, a generator braking torque which is less than or equal to the setpoint total braking torque and less than or equal to the maximally executable available generator braking torque is applicable to at least one of at least one wheel and at least one axle of the vehicle, with the aid of the at least one motor employable in generator mode;
   wherein the activation device is configured to perform the application of the generator torque such that, when the setpoint total braking torque is less than or equal to the maximally executable available generator braking torque:
   prior to at least one of (a) the setpoint total braking torque exceeding a fixedly predefined or establishable threshold value and (b) presence of warning information regarding a transition to a backup level of the regenerative braking system that is potentially imminent or has occurred, the generator torque is applied with approximately zero application of hydraulic torque; and
   subsequently, in response to the at least one of (a) the setpoint total braking torque exceeding the fixedly predefined or establishable threshold value and (b) the presence of the warning information, the generator torque is applied in combination with application of the hydraulic torque, so that the generator torque and the hydraulic torque in combination provide the setpoint total braking torque, wherein the application of the hydraulic torque includes transfer of sufficient brake fluid via at least one hydraulic actuator to at least one wheel brake cylinder of the regenerative braking system to close at least one air gap of the at least one wheel brake cylinder.

9. The control unit as recited in claim 8, wherein the activation device is designed to establish a setpoint volume variable with regard to a setpoint volume of the brake fluid which is to be transferred via the at least one hydraulic actuator to the at least one wheel brake cylinder taking into consideration at least one estimated and/or ascertained increased volume intake of at least one subarea of the braking system hydraulics.

10. The control unit as recited in claim 8, wherein the activation device is additionally designed to establish the setpoint volume variable taking into consideration at least one estimated and/or ascertained friction value at at least one wheel of the vehicle.

11. The control unit as recited in claim 8, wherein the activation device is additionally designed to establish the setpoint volume variable taking into consideration the at least one piece of warning information.

12. A regenerative braking system for a vehicle including a control unit for a regenerative braking system of a vehicle, the control unit comprising:

an activation device designed to activate the at least one motor having a generator mode taking into consideration at least one provided predefined braking signal regarding a setpoint total braking torque requested by a driver or an automatic speed control of the vehicle and at least one provided information signal regarding an available generator braking torque which is maximally executable without overcharging a battery of the vehicle using the at least one motor, employable in generator mode, of the regenerative braking system in such a way that when the setpoint total braking torque is executable at least partially by the maximally executable available generator braking torque, a generator braking torque which is less than or equal to the setpoint total braking torque and less than or equal to the maximally executable available generator braking torque is applicable to at least one of at least one wheel and at least one axle of the vehicle, with the aid of the at least one motor employable in generator mode;

wherein the activation device is configured to perform the application of the generator torque such that, when the setpoint total braking torque is less than or equal to the maximally executable available generator braking torque:

prior to at least one of (a) the setpoint total braking torque exceeding a fixedly predefined or establishable threshold value and (b) presence of warning information regarding a transition to a backup level of the regenerative braking system that is potentially imminent or has occurred, the generator torque is applied with approximately zero application of hydraulic torque; and subsequently, in response to the at least one of (a) the setpoint total braking torque exceeding the fixedly predefined or establishable threshold value and (b) the presence of the warning information, the generator torque is applied in combination with application of the hydraulic torque, so that the generator torque and the hydraulic torque in combination provide the setpoint total braking torque, wherein the application of the hydraulic torque includes transfer of sufficient brake fluid via at least one hydraulic actuator to at least one wheel brake cylinder of the regenerative braking system to close at least one air gap of the at least one wheel brake cylinder.

\* \* \* \* \*